United States Patent Office 3,707,412
Patented Dec. 26, 1972

3,707,412
METHOD OF MANUFACTURING LIQUID PHASE FOR EXPLOSIVE SLURRIES
Archibald H. Adams, Weir, Kans., assignor to Gulf Oil Corporation, Pittsburgh, Pa.
No Drawing. Filed Mar. 13, 1970, Ser. No. 19,473
Int. Cl. C06b 1/04
U.S. Cl. 149—46                                3 Claims

ABSTRACT OF THE DISCLOSURE

A liquid phase which is useful as a base for slurry explosives is made by reacting ammonium nitrate with formaldehyde in aqueous solution and dissolving additional unreacted ammonium nitrate in the aqueous solution, followed by addition of sodium hydroxide, which serves the threefold purpose of adding sodium nitrate to the mixture, raising the pH to a value between 4 and 7 and increasing the temperature to facilitate further mixing with other ingredients of the slurry explosive compositions.

DESCRIPTION OF INVENTION

U.S. Pat. 3,496,040 discloses a class of blasting explosives which consist of aqueous solutions o-ammonium nitrate, hexamethylenetetramine and a thickening agent, having suspended therein solid ammonium nitrate and a solid fuel. Typical composition contain at least 15 percent water, ammonium nitrate, sodium nitrate, hexamethylenetetramine, particulate aluminum and a thickening agent such as guar gum to stabilize the suspension against settling. A peculiar characteristic of the process of manufacturing these suspensions is that heat is absorbed during the dissolving of soluble components, so that it is necessary to either continue stirring for a substantial period of time until the mixture reaches ambient temperature, or supply heat, usually in the form of steam. Either procedure involves expense, which is avoided by the method of this invention.

Briefly, this invention is a method of manufacturing an aqueous solution for use as a liquid phase in slurry type blasting explosives comprising the steps:

(a) Reacting ammonium nitrate with formaldehyde in aqueous solution in a ratio of at least four moles of ammonium nitrate per six moles of formaldehyde and dissolving therein a quantity of unreacted ammonium nitrate to produce an aqueous solution of ammonium nitrate, nitric acid and hexamethylenetetramine, and (b) Adding to the resulting solution of ammonium nitrate, nitric acid and hexamethylenetetramine a sufficient quantity of sodium hydroxide to raise the pH to a value between 4 and 7, preferably within the range of 5.0 to 5.8 and to produce the desired amount of sodium nitrate in the solution.

The heat of neutralization with sodium hydroxide provides the necessary heat to aid in dissolving unreacted ammonium nitrate and also to facilitate the mixing with the gum or thickening agent and other ingredients of the explosive composition.

The procedure described below specifically illustrates the method of this invention:

EXAMPLE 1

Into a stirred vessel was charged 36 parts by weight of water and 138 parts by weight of a 37 percent aqueous solution of formaldehyde. With stirring there was then added 411 parts by weight of solid ammonium nitrate in the form of small granules or prills, and 23 parts by weight sodium nitrate. In this specific example, a certain sodium nitrate content was desired in the finished solution, so a sufficient quantity was added early in the process to effect solution without increasing the time or cost of operating the stirring apparatus. After thorough mixing and allowing sufficient time for reaction to take place, the temperature of the mixture was 45° F. While continuing the stirring, there was then added 37 parts by weight of 97 percent sodium hydroxide. During neutralization the temperature was 118° F. In two minutes the temperature had declined to 104° F. and the final pH was 5.3.

This solution was at a temperature which facilitates the further mixing with other ingredients of explosive slurries and contained approximately 320 parts by weight of ammonium nitrate, 100 parts of sodium nitrate, 40 parts of hexamethylenetetramine, 24 parts of nitric acid and 160 parts of water. The pH was well within the preferred range of about 5.0 to 5.8.

The solution produced by the method described in the above illustrative procedure may be utilized as follows:

While the temperature of the solution is still above about 80° F., it is transferred to a ribbon mixer. There is then added, with mixing, about 9 parts by weight of a commercial gum thickener. Mixing is continued for about 3 minutes to allow the gum to become sufficiently hydrated. There are then mixed in about 80 parts by weight granular aluminum, about 17 parts by weight of pigment grade aluminum powder and about 250 parts by weight of ammonium nitrate in the form of crushed prills or ground crystals, the small particle size facilitating mixing and suspension. This makes approximately 1000 parts by weight of a slurry blasting explosive. The stabilizing gum may be either a commercial self-gelling type or gelation may be initiated by injecting a gelling agent into the exit stream from the pump as the slurry is pumped into the drill hole in preparation for blasting. If desired, other ingredients such as a sensitivity stabilizer may be incorporated in the slurry, as disclosed in U.S. Pat. 3,409,486, and proportions of the suspended solid fuels may be varied so as to alter sensitivity and power to suit the particular blasting situation.

EXAMPLE 2

To further illustrate the method of this invention, there may be reacted together 411 parts by weight ammonium nitrate and 138 parts of 37 percent aqueous formaldehyde in 21 parts of water, followed by addition of 46 parts of 97 percent sodium hydroxide. This results in production of a hot solution containing the desired proportions of ingredients at a pH near 7.

EXAMPLE 3

In another example, 430 parts by weight ammonium nitrate and 173 parts of 37 percent aqueous formaldehyde are reacted together, followed by addition of 48 parts of 97 percent sodium hydroxide. The result is a hot solution suitable for preparation of slurry explosives, having a pH between 5 and 5.8.

I claim:
1. The method of manufacturing an aqueous solution for use as a liquid phase in slurry type blasting explosives comprising the steps:

(a) reacting ammonium nitrate with formaldehyde in aqueous solution in a ratio of at least four moles of ammonium nitrate per six moles of formaldehyde and dissolving therein a quantity of unreacted ammonium nitrate to produce an aqueous solution of ammonium nitrate, nitric acid and hexamethylenetetramine, and (b) adding to the resulting solution of ammonium nitrate, nitric acid and hexamethylenetetramine a sufficient quantity of sodium hydroxide to raise the pH to a value between 4 and 7 and to produce at the same time the desired amount of sodium nitrate in the solution.

2. The method of claim 1 in which a sufficient quantity of sodium hydroxide is added so as to raise the pH to a value between 5 and 5.8.

3. The method of manufacturing an aqueous slurry type blasting explosive comprising the steps:
(a) reacting ammonium nitrate with formaldehyde in aqueous solution in a ratio of at least four moles of ammonium nitrate per six moles of formaldehyde and dissolving therein a quantity of unreacted ammonium nitrate to produce an aqueous solution of ammonium nitrate, nitric acid and hexamethylenetetramine, and
(b) adding to the resulting solution of ammonium nitrate, nitric acid and hexamethylenetetramine a sufficient quantity of sodium hydroxide to raise the pH to a value within the range of 5.0 to 5.8 to obtain in this step a solution of ammonium nitrate, sodium nitrate, nitric acid and hexamethylenetetramine at a temperature above that obtained in step (a), and
(c) while the temperature of the solution is still above about 80° F., mixing said solution with particulate ammonium nitrate, a solid fuel and a thickening agent to form a slurry type blasting explosive.

References Cited

UNITED STATES PATENTS

| | | | |
|---|---|---|---|
| 3,166,452 | 1/1965 | Gordon | 149—46 |
| 3,166,555 | 1/1965 | Gordon | 149—46 X |
| 3,247,033 | 4/1966 | Gordon | 149—46 X |
| 3,409,486 | 11/1968 | Partridge | 149—46 X |

BENJAMIN R. PADGETT, Primary Examiner

S. J. LECHERT, JR., Assistant Examiner

U.S. Cl. X.R.

149—41, 43, 44, 61, 74